United States Patent [19]

StÅlfors

[11] Patent Number: 4,978,983
[45] Date of Patent: Dec. 18, 1990

[54] COMPOSITE CAMERA WITH AUTOMATIC PARALLAX CORRECTION

[76] Inventor: Lennart StÅlfors, Hindbyvägen 29, S-430 63 Hindås, Sweden

[21] Appl. No.: 367,896

[22] Filed: Jun. 19, 1989

[30] Foreign Application Priority Data

Jul. 6, 1988 [SE] Sweden ................................ 8802523

[51] Int. Cl.$^5$ ...................... G03B 29/00; G03B 35/08; G02B 13/16
[52] U.S. Cl. ..................................... 354/76; 354/113; 358/225
[58] Field of Search ...................... 354/76, 79, 75, 129, 354/145.1, 110, 113, 119, 103, 288; 358/909, 225

[56] References Cited

U.S. PATENT DOCUMENTS

| | | | |
|---|---|---|---|
| 2,583,030 | 1/1952 | Waller et al. | 354/119 |
| 4,754,334 | 6/1988 | Kriz et al. | 354/76 |
| 4,829,383 | 5/1989 | Harase et al. | 354/76 |
| 4,855,780 | 8/1989 | Hayakawa | 354/432 |

Primary Examiner—L. T,. Hix
Assistant Examiner—Cassandra C. Spyrou
Attorney, Agent, or Firm—Poms, Smith, Lande & Rose

[57] ABSTRACT

A camera unit is composed of a first camera for photochemical image reproduction and a second, electronic camera. The first camera is provided with a first lens having a first image registration region. The image which is projected onto image plane of the first camera corresponds to the first image registration region. The electronic camera is provided with a second lens whose optical axis is displaced relative to the optical axis of the lens of the first camera. The image registration region of the electronic camera, and thus also of the image projected on its image plane, differs in image content from the image content of the first camera due to the parallax which the displacement causes. A control device is provided for processing an electrical signal received from photosensitive elements contained in the electronic camera. This processing is carried out in accordance with the output of sensors, which generate signals representing the state of the lens of the first camera with respect to focal length and focussed distance, which determine the size of the parallax. The photosensor elements comprise the image lane of the electronic camera. Those photosensor elements which register the image registration region of the photochemical camera are then determined. An output signal is composed for reproduction and/or storage of an image corresponding to the image which the first camera is set to capture on its image plane.

3 Claims, 4 Drawing Sheets

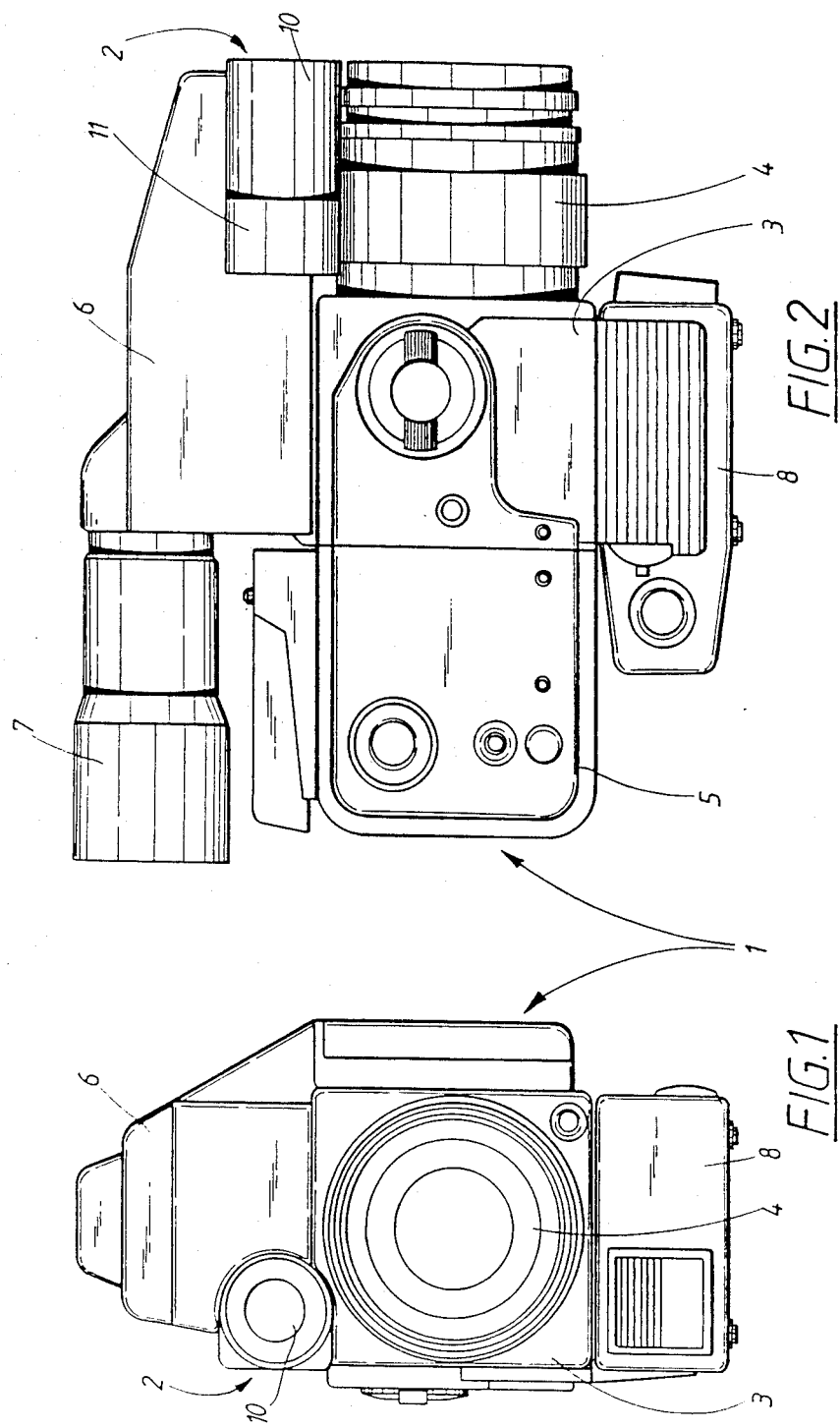

COMPOSITE CAMERA WITH AUTOMATIC PARALLAX CORRECTION

FIELD OF THE INVENTION

The present invention relates to a camera arrangement with both photochemical and electronic registration of a photographic subject image, with compensation for parallactic differences between registered images.

BACKGROUND OF THE INVENTION

In addition to the long and well-known type of camera which uses a photochemical process, there are also electronic cameras for taking still pictures which use an electronic, light-sensitive element. The most common type of light-sensitive element employs a charge-coupled device (CCD), which is includes a large number of CCD-elements, each of which constitutes a photosensor. By registering the level of illumination of each individual CCD-element, an image can be reproduced using the electrical information which is generated. This image may be presented on a display comprising, for example, a cathode ray tube (CRT) or liquid crystals (LCD). By filtering the incident light the image may also be decomposed into colors and its different color components may also be reproduced as a color image. In addition to presentation on a display, the electrical information may be reproduced as permanent images by some type of printer, and may also be transmitted or stored electronically.

In an electronic camera, image information is generated as an electrical signal and not, as in conventional cameras, as the result of a photochemical process. Electronic cameras thus offer certain advantages over the photochemical image production process. The image is for example generated immediately upon illumination of the photosensitive elements in the electronic camera and each change in the image may be registered. The image contents are immediately available for image analysis and for altering the image electronically, and the generated image signal can be transmitted immediately after it is created. On the other hand, there is the disadvantage that the image resolution is considerably worse than that which is achieved using good cameras having fine-grained film material. In applications requiring high resolution, a conventional camera is therefore irreplaceable.

In certain applications it may therefore be useful to combine a camera of the conventional type with an electronic camera to form a composite camera. In this way one may at each instant use the electronic camera to inspect the photographic subject which is located in front of the camera and even transmit this information for the purpose of remote control. When a picture is taken using the photochemical system the image content may simultaneously be registered electronically. Based on the electronically registered image, which can be both analyzed and transmitted electronically rapidly, one may then decide how the exposed film is to be processed: developed and printed either immediately or within a certain time period, or possibly not developed at all if the electronic image information indicates that the exposed film image will be of no interest or of unsatisfactory quality.

The possibility of obtaining an electronic image is also of great value in portrait photography. Since the photographic subject is constantly changing, the exposed picture may possibly not be acceptable. By examining the electronic image, one may thus avoid processing unusable pictures.

Composite cameras may also find use in space technology, whereby one could receive from space vehicles an instantaneous transmission of the contents of photochemically exposed pictures using the electronic camera. The photochemical image with its greater resolution may then be retrieved by a space shuttle, or after the space vehicle lands. The processing of the photochemical image is then determined on the basis of the information from the previously registered electronic image.

One way of producing a composite camera is to use the viewfinder system of a single-lens reflex (SLR) camera for recording the electronic image. This would, however, mean that the electronic image is available only up to a certain time before exposure of the photochemical image, that is, until the time when the mirror must be retracted and the lens stopped down. In systems with a human operator, one might often also wish to use the viewfinder system of the camera. In such systems it would be necessary to split the optical light beam, thereby reducing the light strength not only of the viewfinder image but also of the image projected on the CCD sensor unit.

The purpose of the present invention is to provide a composite camera for both photochemical and electronic image production which eliminates the above-mentioned disadvantages by allowing both camera systems to function separately, each according to its own technical specifications, and to automatically eliminate the problem of parallactic differences between the electronically registered image and the photochemically registered image.

SUMMARY OF THE INVENTION

According to the invention, a composite camera is arranged to form a camera unit. The camera unit comprises a first camera for photochemical image registration on film of a first projected image, and a second camera for electronic registration of a second projected image. The first camera includes a first lens having a first image registration region and a first optical axis, as well as a first image plane. The first projected image is projected onto the first image plane and corresponds to the first image registration region. The first camera also includes a lens data unit for generating lens state signals according to the state of the first lens, including a focal length signal and a focussed distance signal. The second camera includes a second lens having a second image registration region, and a second optical axis displaced from the first optical axis; and photosensitive means for photoelectrically registering the first and second image registration regions, including a plurality of photosensitive elements. A control unit is also provided for receiving the lens state signals; for selecting, on the basis of the lens state signals and the displacement of the first optical axis from the second optical axis, from among the photosensitive elements primary photosensitive elements corresponding to and registering the first registration region; and for generating an output signal corresponding to a photoelectric representation of the first projected image.

BRIEF DESCRIPTION OF THE DRAWINGS

An exemplifying embodiment of the invention is shown in the drawings. FIG. 1 shows a front view of the composite camera and FIG. 2 shows a side view.

DETAILED DESCRIPTION

Figure 3:
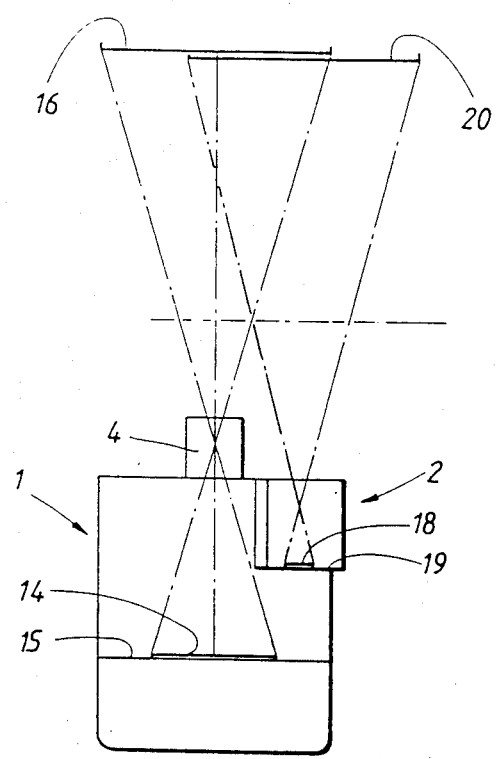
FIG. 3 shows schematically the path of light in a certain type of camera.

The composite camera according to the invention comprises two main units: a single-lens reflex (SLR) camera 1 for photochemical reproduction on a film, and an electronic camera 2. The SLR camera, which is referred to below as the photo-camera 1, comprises a camera housing 3, with a retractable mirror (not shown) in the light path and a first lens 4. Opposite the first lens is a film magazine 5 and, on the side of the camera, a viewfinder system 6 with an eyepiece 7. A winder 8 is also provided, by means of which an electric motor provides for the mechanical operations of the photo-camera 1: controlling the lens, moving the mirror and advancing the film. If the camera is intended for remote control, the magazine and winder system may for example be augmented to provide for automatic changing of magazines.

The arrangement of an SLR camera is well known and need therefore not be described in further detail. It should, however, be mentioned that the light path upon film exposure passes directly through the lens to a film plane which is located generally where the magazine 5 is connected to the camera housing 3. When using the viewfinder, however, the path of the light is deflected by means of the aforementioned retractable mirror and in some cases by optical devices in the viewfinder.

In order to achieve the stated purpose that the electronic camera not influence the photo-camera or be interfered with by the operation of the mirror, the principle functions of the two cameras are separated from each other. The electronic camera 2 thus constitutes a separate unit, which is fastened by means of a fastener, for example, on the viewfinder device 6, and thereby on the camera housing 3. The electronic camera comprises a second lens 10 and a sensor unit 11 containing the primary sensor circuitry. The sensor circuitry includes the aforementioned CCD-elements, on whose image plane the second lens 10 casts an image. As mentioned, both cameras include lenses. In the case of the high-quality image which, it is assumed, is required by exposure in the photo-camera, it is also assumed that the lens of the photo-camera is of such a type that focussing is required.

It is conceived that the electronic camera may be provided with a fixed-focus lens, which generally has less definition than an adjustable lens, and which requires a limited diaphragm size in order for the depth of field to be acceptable. If, however, one prefers to provide the electronic camera with an adjustable lens, this lens may be adjusted by mechanically connecting it to the lens 4 of the photo-camera 1. In this way one may synchronize the adjustment of the two lenses and use the equipment for focussing which is required on the photo-camera.

Figure 4:
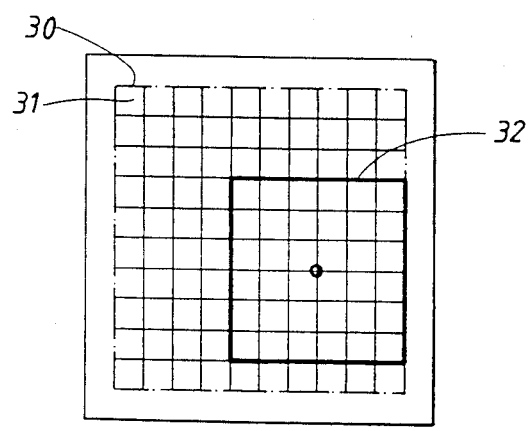
FIG. 4 illustrates the light-sensitive element of the electronic camera.

The sensor circuitry in the electronic camera must operate within a certain light interval. A diaphragm is therefore generally required on the lens of the electronic camera. Since both cameras work with the same photographic subject, the diaphragm adjustment may also be synchronized for the two cameras, suitably by mechanically coupling the two lenses. As can be seen in FIGS. 1 and 2, the electronic camera 2 is so located that the centerline or optical axis of the second lens is displaced a certain distance from the centerline or optical axis of the first lens 4 of the photo-camera. As FIG. 3 schematically shows, parallax thereby arises. This means that the image 14 which is cast onto the image plane 15 through the lens 4 corresponds to a first registration region 16. The image 18, which is cast on the image plane 19 (comprising the surface of the CCD-unit) of the electronic camera 2 corresponds to a second registration 20, which, in the illustrated embodiment, is displaced sideways and vertically relative to the first registration region 16. This displacement thus arises because of the difference in lateral and vertical placement of the optical axis of the lenses. Since the edges of the images in FIG. 4 are parallel with the edges of the camera housing 3, and since the optical axis of the electronic camera is displaced both sideways and vertically relative to the optical axis of the photo-camera and to the edges of the image, the corresponding displacement as shown in FIG. 3 arises in two directions if one orients oneself according to the image edges.

The relative displacement of the registration regions 16 and 20 means that they only partially overlap. Certain portions of the image which is received by the photo-camera 1 may furthermore not be present in the electronic representation. This is the case when no special measures are taken, and the relationship shown in FIG. 3 may be said to comprise the initial relationship for the invention.

The initial relationship is previously known in the field of photography as the so-called viewfinder parallax, which means that the image at a viewfinder, whose optical axis is displaced relative to the optical axis of the lens, does not agree with the exposed picture. It is thereby known to compensate for this parallax by rotating or "tilting" the optical axis of the viewfinder, so that agreement is achieved between the exposed picture and the viewfinder image, at least for some chosen focussing distance of the camera lens. The parallax becomes greater the closer the lens is located to the area of the photographic subject. When the photographic subject is located much further away "at infinity", the parallax is negligible. For macro pictures, however, the parallax completely precludes the possibility of determining the boundaries of the picture by means of the viewfinder if no parallax adjustment is undertaken. The viewfinder must therefore be rotated according to the focussing distance of the lens, which represents the distance from the camera to the photographic subject region. The rotation also depends on the focal length of the camera, such that a longer focal length provides less parallax than a shorter. In the present case one wishes, however, to avoid rotating the viewfinder lens altogether, since rotation of the viewfinder requires an additional mechanical system, which in turn requires great precision. It is furthermore not desirable to rotate the electronic camera because of its electrical contacts. In response, the invention provides a device as described below.

Figure 5:
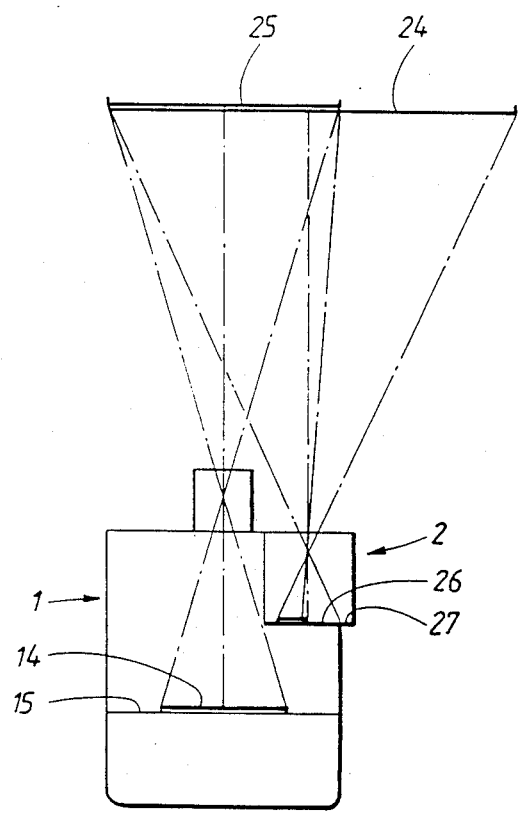
FIG. 5 shows schematically in the same manner as FIG. 3 the principle of the invention by means of illustrating the light paths.

Considering FIG. 5, which is a schematic representation of the same type as in FIG. 3 but which shows the device according to the invention, one sees that the electronic camera 2 here has an image angle which is so much greater than the image angle of the photo-camera that, despite parallax, the received second subject image registration region, here designated 24, covers the entire first registration region 25 of the photo-camera 1. The scope of registration of the projected image 26 of the electronic camera onto its image plane 27 is however consequently larger than the scope of the projected image 14 in the photo-camera 1. In order to determine the content of the image 14 one must therefore limit the projected image 26.

According to the invention the projected image 26 is limited by limiting the presentation of signals from the CCD-unit; the principle of this is shown in FIG. 4. Within the border designated by reference numeral 30 there are a number of photosensors 31, which together comprise the CCD-unit. The area within the border 30 covered by the photosensors constitutes the total possible image region of the electronic camera, which represents the second registration region 24 according to FIG. 5. The border 32 shows that portion of the projected image which corresponds to the first registration region 25, that is, the contents of the image 14 in the photo-camera 1. The position of the border 32 relative to the border 30 depends on the relative displacement of the lenses of the cameras, the distance to the photographic subject, that is, the distance for which the lens if focussed, and the focal length of the lens of the photo-camera.

The focal length of the lens additionally determines the size of the surface which the border 32 will enclose. When the focal length of the lens 4 of the photo-camera is greater than the focal length of the lens of the electronic camera, the image which corresponds to the first registration region 16 is smaller than when the difference between the focal lengths is less. In other words, when the focal length of the lens 4 increases, the area within the border 32 decreases, and the displacement of the border 32 relative to the border 30 decreases. When the focal length decreases, the area within the border 32, as well as the displacement, increase. For a zoom lens the relationship of course depends on the setting of the focal length.

Since the image projected within the border 30 should always contain the complete image content of the image 14 of the photo-camera, the image angle of the electronic camera 2 is chosen in such a way that this is achieved for all foreseeable focal lengths of the lenses 4 which may be used for the photo-camera.

Figure 6:
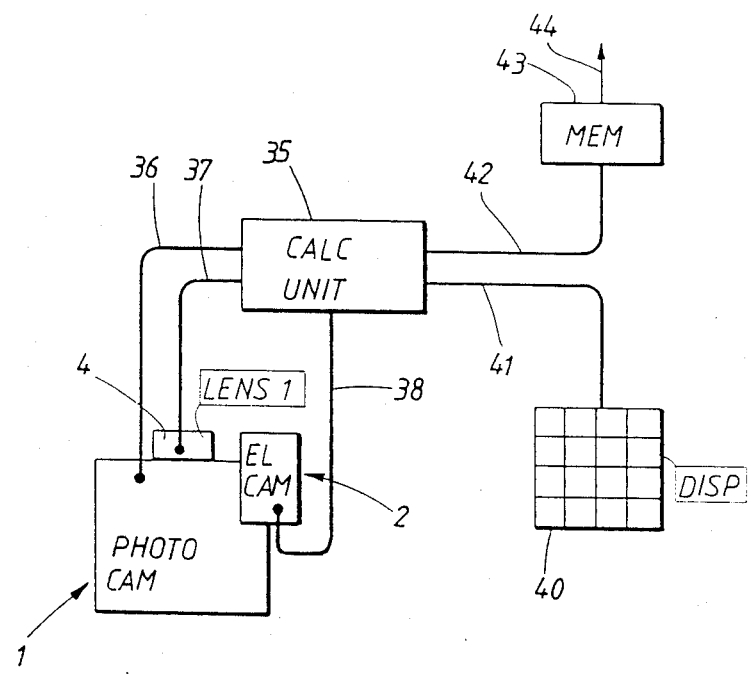
FIG. 6 shows a block diagram of the invention.

A block diagram of the device is shown in FIG. 6. Both the photo-camera 1 and the electronic camera 2 are shown. The lens of the photo-camera is as before designated by the reference numeral 4. In addition, a block representing a calculation unit 35 is shown, and is assumed to be mounted in the camera housing 3. By means of one or more conductors 36, information concerning the focal length of the mounted lens 4, or of the currently set focal length of a zoom lens, is input to the calculation unit 35 from the photo-camera 1. An electrical signal representing the distance for which the lens 4 is focussed is input via a lead 37. Data concerning the strength of illumination of each of the photosensors 31 is input to the calculation unit via a lead 38.

Using data generated by a lens data unit (not shown) concerning the current focal length of the lens and its adjusted focus, as well as stored information concerning the placement of the optical axes of the lenses of the two cameras in relation to each other, a signal can be calculated which represents the location of the border 32 within the total image field within the border 30, for which illumination data is received via the lead 38. Using the above mentioned signal, the signal representing the image in the electronic camera can thereby be limited to include only the output of the photosensors which are located within the border 32. Via a lead 42, the signal representing the image can be transferred to a memory or storage unit 43, which may be combined with a transmission unit for sending a remote signal via a communication line or link 44, which may be wireless.

The signal, which represents the contribution limited to a portion of the CCD element, may be expanded in such a way that it provides a signal for an image which covers a predetermined area, namely, the area of a display 40. The display 40 is connected via a lead 41 to the calculation unit 35 or to some other image reproduction device such as a printer.

The said expansion of the limited signal representing the photosensors within the border 32 may be accomplished by dividing the signal from each photosensor into several sub-signals in such a way that the number of such signals corresponds to the pixel resolution of the display or printer. Alternatively, the signal may be used for reproduction in the form in which it is received with the image area either framed or with irrelevant portions deleted.

An embodiment has been described above in which the image angle of the electronic camera covers a representation region which is large enough that all of the lenses for the photo-camera 1 which are intended to be used in conjunction with the electronic camera provide an image in the photo-camera which always fits within the image region of the electronic camera. Accordingly, if the electronic camera is to accommodate both images from photo-camera lenses having very short focal length as well as lenses having very long focal length, and to simultaneously allow parallactic displacements within the region, only a very small portion of the area of the CCD-element will be used for lenses with long focal length. In such case the resolution will be poor, since only relatively few sensor elements will be located within the utilized image border 32.

For widely varying focal lengths the following alternative embodiment may therefore be suitable: the lens on the electronic camera 2 is interchangeable, as well as is the lens 4 on the photo-camera 1. The two respective lenses are constructed as pairs and form a unit. This unit may then contain the previously mentioned mechanical coupling between the lenses for distance and diaphragm adjustment. In order to change lenses, the entire unit is changed. In this way the focal length of the second lens of the electronic camera changes proportionately with the changes of the lens 4 when the unit is exchanged. It is then possible to utilize the area of the CCD-unit to a greater extent for all focal lengths. If the photo-camera is provided with a zoom lens, according to this arrangement the lens of the electronic camera will also be a zoom lens. as for photographic subjects illuminated by other light sources than the flash, by the operation of the shutter. The camera is preferably provided with an automatic switching device for switching between its synchronization modes depending on whether a flash unit is used.

It is also possible to provide the electronic camera for automatic focussing.

The magazine 5 of the photo-camera 1 is in many cameras equipped to admit reflected data, that is, to allow exposure on the film of certain data such as the time of exposure and also other photographic values. In such cameras a light display under the control of a processor is often used. The same signals which are used to control this light display may be used to reproduce corresponding data on the reproduction of the image which is captured using the electronic camera. If, as was mentioned, one uses different measurement fields for light measurement, the symbols which represent these different measurement fields may also be reflected inward and be registered in the image of the electronic camera, and may also be presented in the optical viewfinder 6.

As has been described above, significant advantages may be achieved using the composite camera according to the invention. Its main functions and advantages are thus that it can provide an immediate reproduction of an image corresponding to the image which is latent in the photographic film, so that the further processing of the film may be determined before development and printing. The reproduction is also suitable for use as a viewfinder image, which provides information concerning the state and changes of the photographic subject. It is of great value in the area of remote-controlled photography and also where the photographic process must be supervised by persons other than the one who is operating the camera.

What is claimed is:

1. A composite camera arrangement forming a camera unit, said camera unit comprising:
   a first camera for photochemical image registration on film of a first projected image, the first camera including:
   a first lens having a first image registration region and a first optical axis;
   a first image plane;
   lens data means for generating lens state signals according to the state of the first lens, including a focal length signal and a focussed distance signal;
   said first projected image being projected onto the first image plane and corresponding to the first image registration region;
   a second camera for electronic image registration including:
   a second lens having a second image registration region, and having a second optical axis displaced from the first optical axis;
   photosensitive means for photoelectrically registering the first and second image registration regions, including a plurality of photosensitive elements;
   control means for receiving the lens state signals; for selecting, on the basis of the lens state signals and the displacement of the first optical axis from the second otical axis, from among the photosensitive elements primary photosensitive elements corresponding to and registering the first registration region; and for generating an output signal corresponding to a photoelectric representation of the first projected image; and
   in which the focal length of the first lens is in a predetermined range, and in which the second lens has an image angle sufficiently large that the first image registration region is contained in the second image registration region for all focal lengths of the first lens in the predetermined range.

2. An arrangement is defined in claim 1, in which the control means is provided for transferring the output signal as an electronic viewfinder image and for storing an exposed image output signal corresponding to the first projected image at a moment of exposure of the film.

3. An arrangement as defined in claim 2, in which the control unit is provided for selective switching between generation of the exposed image output signal at a moment of shutter activation and at a moment of flash.

* * * * *